Patented Dec. 6, 1949

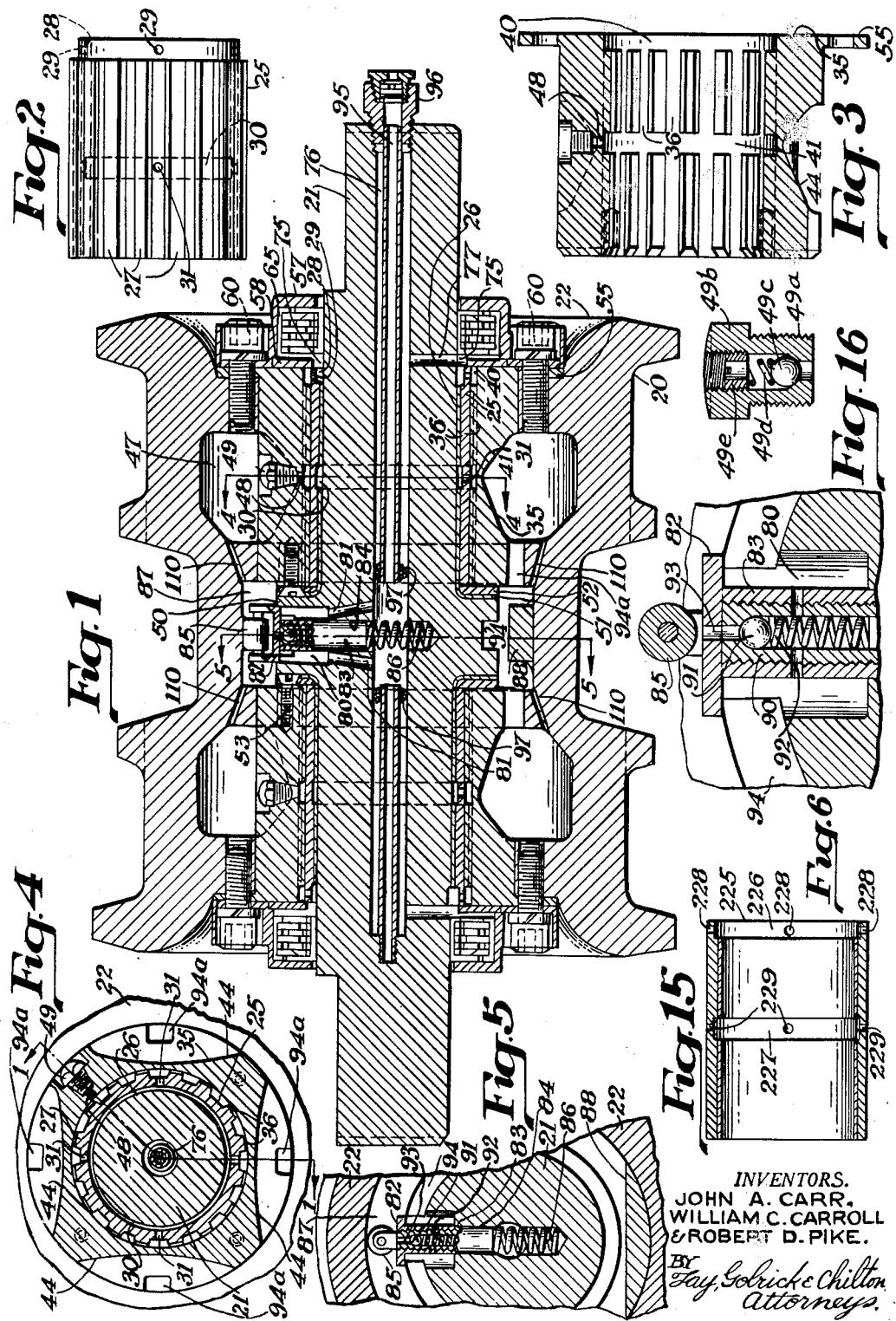

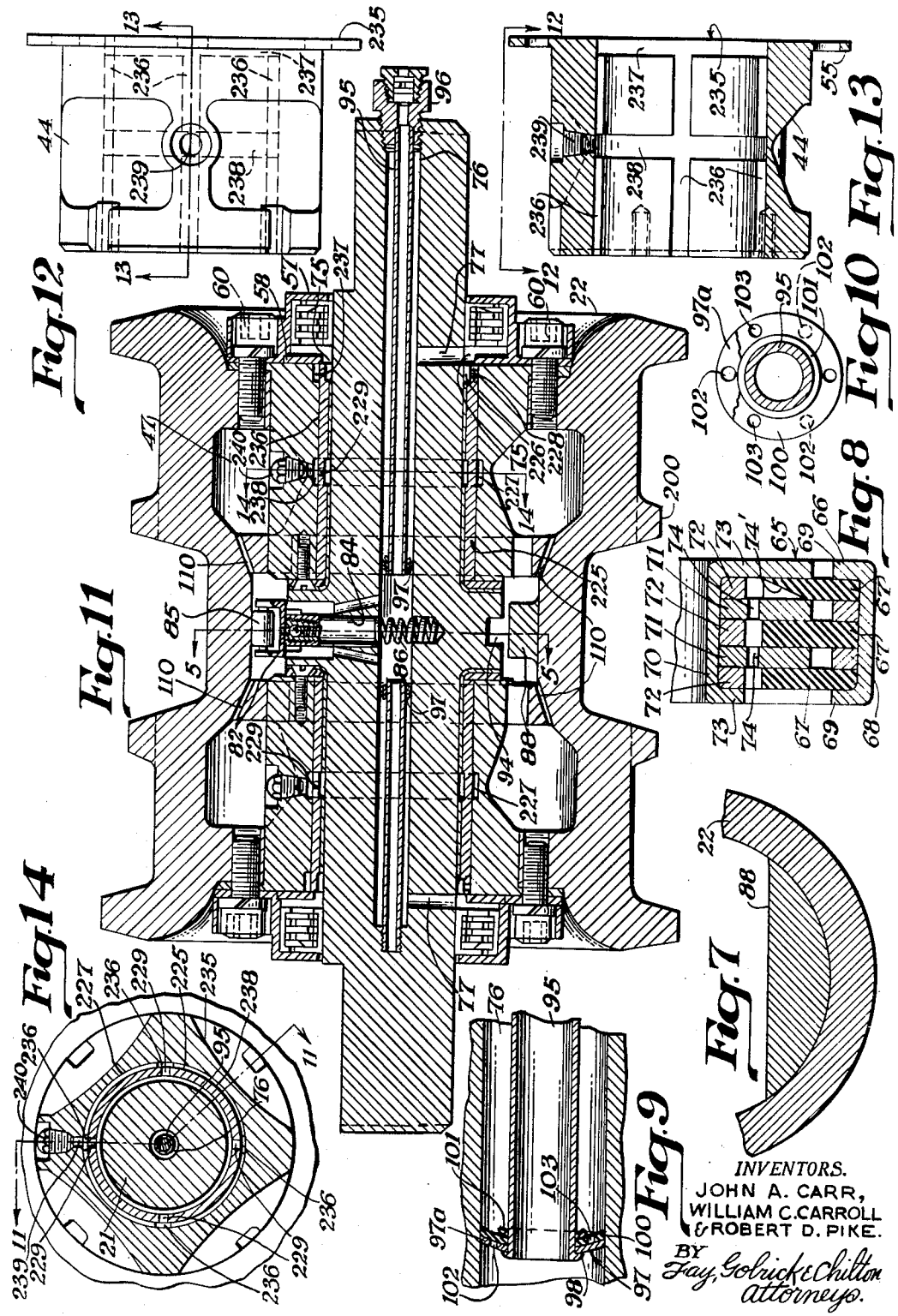

2,490,027

UNITED STATES PATENT OFFICE 2,490,027

PRESSURE LUBRICATED TRACK TRACTOR ROLLER

John A. Carr and William C. Carroll, Portland, Oreg., and Robert D. Pike, Pittsburgh, Pa., assignors to Carroll Pressure Roller Corporation, Portland, Oreg., a corporation of Oregon Application June 16, 1945, Serial No. 599,884

6 Claims. (Cl. 308—107)

The present invention relates to bearings, and particularly to bearings for use in mechanisms wherein the rotation of the bearing is relatively slow and is subjected to an environment of grit, such as mud and dirt, for example.

Our improved bearing has particular utility in rollers for endless track type tractors wherein the rollers support the weight of the tractor and ride on the endless track, although it is to be understood that the invention may be adapted as well to other types of mechanisms. Heretofore, bearings for the rollers described hereinbefore have had a relatively short life due to the inability to properly lubricate the bearings and to exclude grit and foreign matter from the bearing surfaces. Furthermore, such bearings are subject to severe shocks, and this factor together with the faults just mentioned shorten the life of the bearings.

An object of the present invention is to provide a bearing for a roller, or wheel, or the like, in which the bearing is sealed against the entrance of dirt or other foreign matter and lubricant is forced under relatively high pressure through certain elements of the bearing and between the bearing surfaces thereof during rotation of the roller or wheel.

Another object of the invention is to provide within a bearing mechanism of the character described, an oil pump actuated by movement of a part of the bearing mechanism relative to another part, and a reservoir for lubricant being provided from which oil is forced under relatively high pressure to certain parts of the bearing by the pump.

A still further object of the invention is to provide a bearing of the type described in the preceding two paragraphs in which a seal is provided between the shaft on which the bearing is supported, for example, and the parts of the bearing adjacent the shaft, which seal is effective to exclude dirt and other foreign matter from entering the bearing, the seal being adapted to permit slight seepage of lubricant outwardly for carrying away any foreign matter that might otherwise work its way into the bearing mechanism.

It is also an object of the invention to provide a bearing of the character described which will withstand extremely severe shocks without being adversely affected.

Other objects and advantages of the invention will be apparent from the following description of two preferred forms of the invention, reference being had to the accompanying drawings wherein:

Fig. 1 is a longitudinal view in section of a roller for an endless track type of tractor, the section being taken substantially on line 1—1 of Fig. 4;

Fig. 2 is a view in elevation of a member of the bearing;

Fig. 3 is a view in section of another member of the bearing;

Fig. 4 is a view in section taken on line 4—4 of Fig. 1;

Fig. 5 is a fragmentary view in section taken on line 5—5 of Fig. 1;

Fig. 6 is a fragmentary view of a check valve for the pump shown in Fig. 5, but on a larger scale;

Fig. 7 is a fragmentary view taken on line 5—5 of Fig. 1, but on a larger scale;

Fig. 8 is a fragmentary sectional view of a seal shown in Fig. 1, but on a larger scale;

Fig. 9 is a fragmentary view in section of a check valve shown in Fig. 1, but on a larger scale;

Fig. 10 is an end view in elevation of the check valve shown in Fig. 9, a part being shown broken away;

Fig. 11 is a longitudinal view in section of a roller for an endless tread tractor embodying another form of the invention, the section being taken substantially along line 11—11 of Fig. 14;

Fig. 12 is a view in elevation of a member of a bearing shown in Fig. 11;

Fig. 13 is a view in section taken on line 13—13 of Fig. 12;

Fig. 14 is a view in section taken on line 14—14 of Fig. 11;

Fig. 15 is a longitudinal sectional view of a member of the bearing shown in Fig. 11 and Fig. 16 is a sectional view of a pressure responsive oil valve.

Referring to the drawings, we have shown one form of the invention as embodied in a roller 20, which is particularly suitable for use with an endless track type of tractor, wherein weight of the tractor is supported by the roller resting on the track, although it is to be understood that the invention might be embodied in other types of mechanisms, such as tanks and the like. The roller 20 includes an axle or shaft 21 that is adapted to be non-rotatively supported by the frame of the tractor by suitable brackets, not shown. Mounted for rotation on the shaft 21 is a wheel 22, the periphery of which is flanged and recessed to guide the wheel on the endless track, not shown. The wheel 22 is supported on the shaft 21 by a bearing mechanism that insures adequate lubrication of all bearing surfaces and which excludes grit and the like from entering between the bearing surfaces.

Opposite ends of the wheel 22 are supported by bearings that are similar and for the sake of clarity and to avoid repetition, only one such bearing will be described.

Preferably, the bearings are similar to a form of bearing disclosed in the co-pending application of Robert D. Pike, Serial No. 566,818 and they are comprised of a sleeve 25, which is preferably formed of steel and having the inside surface coated with a suitable bearing metal 26, such as bronze, and which sleeve is mounted on the shaft 21. The sleeve 25 is provided with a plurality of longitudinally extending ribs or splines 27, which may be formed by grooving the sleeve. The inside diameter at one end of the sleeve 25 is enlarged as at 28 for forming an oil passage extending about the shaft 21, and a plurality of radially extending openings 29 are drilled in the sleeve and form passages leading from the passage 28 outwardly. Also, a groove 30 is formed about the inner surface of sleeve 25 centrally thereof, and a plurality of radially extending passages 31 are formed in the sleeve leading from the groove 30 outwardly. The walls of groove 30 and the shaft 21 form an oil passage encircling the shaft 21.

A tubular hub member 35 is mounted on the sleeve 25 and is intermediate the sleeve and the wheel. The inside walls of the member 35 are grooved as at 36 for receiving the splines 27 of the sleeve. Preferably, the sleeve 25 fits relatively loosely in the hub 35, there being a minimum clearance of approximately .005 inch between the surfaces of the sleeve intermediate the splines thereon and the confronting surfaces of the hub. The clearance between the outer surfaces of the splines 27 and the bottom surfaces of the grooves 35 is preferably approximately .040 inch for providing sufficient area for free flow of oil through the grooves. By providing the respective clearances, when oil is circulated between the respective confronting surfaces, in a manner to be described hereinafter, the sleeve 25 "floats" on the lubricant. Thus, when shocks are borne by the bearing they are absorbed by two oil films in series, namely, the oil film between the shaft and sleeve bearing surfaces and the secondary oil film between the sleeve and the hub. The outer end of the hub 35 has a groove 40 extending about the inside thereof, which groove forms an oil passage into which the passages 29 open. A central groove 41 is also formed about the inside of the hub and in registration with the oil passages 31. As may be seen in Figs. 3 and 4, the hub 35 is recessed at 44 in four sides thereof intermediate its ends. An annular channel 47 is formed in the wheel 22 which, in combination with the recesses 44, provides an oil reservoir. Oil may be fed to this reservoir from the passage 41 in the hub 35 through a passage 48 formed in the hub and a pressure operated valve 49 disposed in the passage. The valve may be of any suitable type which permits passage of oil from the interior of the hub outwardly in response to a predetermined pressure at the valve inlet.

Referring to Fig. 16 of the drawings, the valve 49 is shown comprising a valve body consisting of a threaded stem 49ª depending from a hexagonally shaped head 49ᵇ. The body has an axial bore extending therethrough and the lower portion of the bore is reduced and shaped to form a valve seat for a ball valve 49ᶜ. The ball 49ᶜ is urged toward the valve seat by a compression spring 49ᵈ and the spring is adjustably compressed against the ball by a tubular stop member 49ᵉ which is threaded into the upper portion of the bore so that it may be adjustably positioned in the bore by rotation in one direction or the other. It will be apparent that when the oil pressure against the ball is below a predetermined value the ball will be pressed to the valve seat, but when the oil pressure exceeds that of the spring, the ball is moved from the valve seat and oil will flow through the valve.

The shaft 21 is enlarged at 50 for providing thrust bearing surfaces 51. A flat annular bearing member 52 is attached to the inner end of the hub 35 by a plurality of bolts 53, only two of which appears in the drawings. The surfaces of the bearing member 52 abutting the shaft, preferably, are bronze.

The outer end of the hub 35 is flanged as at 55 and the inside surface of the flange abuts the wheel 22. An annular retaining member 57 abuts the flange 55 and it also secures a flat washer 58 over portions of the ends of the sleeve 25 and hub 35. The member 57 is secured to the wheel 22 by bolts 60 which extend through openings in member 57 and flange 55, and which bolts are threaded in openings in the wheel. It is to be understood that only two of the bolts 60 are shown although there are preferably at least six. Preferably, the abutting faces of the member 57 and flange 55 are such that an air tight seal is formed.

A substantially air-tight seal 65 is interposed between the shaft 21 and the retaining member 57. This seal is preferably like that described in the co-pending application of J. A. Carr, Serial No. 599,883, filed June 16, 1945. Referring to Fig. 8, the seal comprises an outer steel ring 66 which is press fitted in the inner surface of the member 57. A plurality of flat rings 67, preferably formed of a resilient rubber-like oil resistant material, are spaced from one another by spacer rings 68, which rings are preferably of sintered, compact powdered metal, such as copper but may be of steel. The rings 67 and 68 are held in place by turning the edges 69 of ring 66 inwardly and crimping them against the adjacent rings. A steel ring 70 is press fitted about shaft 21 and flat porous rings 71, preferably formed of a sintered, powdered metal, such as copper, and spaced apart by steel spacer rings 72, are secured to the ring 70 by turning the ends 73 of the ring 70 and crimping the ends against the end rings. The rings 67 lie adjacent to and frictionally engage rings 71, and a film of oil is maintained between the rings, which oil may be supplied to the rings through small openings 74 drilled in rings 71, which openings are in registration with the spaces between the inner edges of rings 67 and the peripheries of spacer rings 72. But holes 74 may be omitted in whole or in part and seepage through the rings 71 depended upon entirely for supplying lubricating oil to all rubbing parts.

Preferably, the outer ring 67 has a surface 74' which slopes toward the outer surface so that oil pressure bearing on surface 74' will press the outer ring against the end 73 of ring 70 as a final seal. It will be understood that when the wheel 22 is rotated, the rings 67 will move relative to the rings 71, and the oil intermediate the surfaces will provide lubrication and also form a seal between the surfaces. The resilient rings 67 may be pressed laterally by pressure within the annular chamber formed at 75 against the adjacent rings 71 so that the higher the pressure inside the bearing the tighter the seal. There may be a slight oil leakage outwardly through the seal and this will tend to carry away any grit that might otherwise enter between the rings of the seal.

The shaft 21 is bored centrally at 76 and an oil passage 77 is drilled to interconnect the bore 76 and an annular chamber 75.

The central portion 50 of the shaft 21 has a cylinder 80 formed therein and six passages 81, only two of which appear in the drawings, interconnect the cylinder with the bore 76. A piston 82 is mounted on a guide rod 83, which rod reciprocates in a bore 84, the axis of which coincides with that of the cylinder. The piston 82 has a roller 85 rotatively mounted thereon, and a compression spring 86 in the bore 84 acting on the rod 83 urges the rod outwardly for maintaining the roller 85 against the inside wall of the bore of wheel 22. A cam 88 is provided on the wall of the wheel bore and it is adapted to engage the roller 85 and move the piston 82 in the cylinder 80 against the resistance of spring 86 once during each revolution of wheel 22. The rod 83 has an axial bore 83a and transverse openings 83b leading to the bore. A check valve sleeve 90 is threaded in the bore and openings 83c in the sleeve register with the openings 83b in the side walls of sleeve 90. A ball 91, pressed by a spring 92 against the mouth of a restricted opening 93 in the sleeve 90, serves as a check valve that admits oil from the recess 87, formed at the center of the wheel 22, through the sleeve 90 to the cylinder 80 on the outward stroke of the piston and closes the sleeve 90 on the inward stroke of the piston. Thus, the piston 82 pumps oil from recess 87 into the bore 76 through passages 81 as the wheel 22 rotates. Oil may also be fed to cylinder 80 under the piston 82 through a circular channel 94 formed about the portion 50 of shaft 21. The functions of the check valve 91 and the channel 94 are the same, that is, to supply oil to the pump cylinder 80 and either one may be relied upon alone, omitting the other, or both may be used as illustrated.

Oil is fed to recess 87 through a plurality of openings 94a formed in the periphery of the hub 35 and interconnecting recesses 47 and 87. Preferably, there are four such openings equally spaced about the periphery of the hub.

Oil is charged into the bearing through a tube 95 which extends in the bore 76. The outer end of tube 95 is secured in a nipple 96 threaded in the bore 76 and the nipple is preferably provided with a fitting by which oil may be injected into the tube under high pressure and which fitting prevents the escape of oil and excludes grit and the like from the tube. Such fittings are obtainable commercially and the detail thereof is not shown here. The inner end of the tube is open and an annular check valve 97 is provided intermediate the tube and walls of the bore 76. This valve comprises an annular steel plate 97a (see Figs. 9 and 10) secured on the end of the tube by turning the end of the tube as shown at 98, which plate has a concave face, and a washer 100, formed of resilient rubber-like oil resistant material, is maintained against the concaved face of the plate 97a by a ring 101 pressed on the tube. The plate 97a and washer 100 are each perforated as at 102 and 103, but the perforations in the plate are offset relative to the openings in the washer. Thus, oil may flow through the perforations in plate 97a and spring the washer 100 from the perforations for admitting the oil between the tube 95 and the walls of the bore 76, but the flow of oil in the opposite direction will be blocked as the washer 100 will close the perforations in the plate.

Oil is introduced into the bearing mechanism through tube 95 under pressure as high as 1000 lbs. per sq. inch, and the air in the bearing will collect at the top of chamber 47 under heavy pressure. Preferably, to insure the collection of air at the top of the chamber 47 so that oil may be fed to the pump, eight openings 110 are drilled through the wall separating these chambers so that an opening will be above the oil level at all times. Thus, pneumatic pressure is built up in chamber 47 which will force oil to the intake of the pump through channels 94a.

When the tractor is operated, wheel 22 revolves and the cam 88 strokes the piston 82 downwardly. This action forces oil through passages 81 and check valve 97, into bore 76 and through passage 77 to annular chamber 75 and into passage 28. From passage 28 the oil is fed to passage 40 through the connecting passages 29. From passage 40, the oil flows into the passages formed between the outer faces of the grooves 36 of the hub 35 and the outer faces of the splines 27 of sleeve 25, then through annular passage 41 to passage 48 and through check valve 49 and into the reservoir 47. The valve 49 will cause considerable pressure to be built up in the passages 30, 31 and 40, and consequently oil will be forced between the bearing surfaces of the shaft 21 and the sleeve 25, insuring an adequate supply of lubricant thereto. Oil flowing relatively freely through the grooves in member 35 carries away heat from the hub 35. The oil in reservoir 47 flows through the openings 94a into the intake chamber 87. Since the interior of the wheel 22 is sealed at the ends thereof, the air cannot escape, and will collect at the top of the chambers 47. The spring 86 returns the piston to its outer position after the cam passes the roller 85, and during this movement the ball 91 is displaced from the opening 93 for admitting oil into cylinder 80, and oil may also be admitted to cylinder 80 through the channel 94. Oil is continuously fed to the pump inlet by centrifugal action when the tractor is in operation, although the oil level except for centrifugal force would otherwise be below the intake. Thus, the pump forces oil through the bearing members for thorough lubrication and to provide cooling thereof.

It is to be understood that the pump also furnishes oil in a similar manner to the elements of the bearing and roller at the opposite end of the roller, which bearing is similar to that described hereinbefore.

It will be seen that in the form of embodiment of the invention just described, rotation of wheel 22 will actuate the pump which forces lubricant between the relatively moving bearing surfaces and between the hub and sleeve members so that the bearing surfaces are positively lubricated and a double oil film is provided for absorbing shocks. The valves 49 assure that the bearing will receive ample lubricant before the oil is returned to the reservoirs. The seals at opposite ends of the wheel exclude dirt and other foreign matter from entering the bearing mechanism and a slight seepage of the oil outwardly through the seal carries away any material that might tend to work in through the seal. By providing the pump and oil reservoirs within the wheel 22, the seepage of oil through the seal will have no effect on the lubrication of the bearing until the level of the oil falls to a certain point. However, new oil may readily be added to the reservoirs for maintaining proper lubrication.

Referring to Figs. 11 through 15, we have shown a roller 200, which roller is similar to roller 20 except for the sleeve and hub construction. Parts of the roller 200 similar to those of roller 20 will be referred to by the same reference numerals.

A sleeve 225 is rotatively mounted on shaft 21 and presents a suitable bearing surface to the shaft. The inside diameter at one end of the sleeve 225 is enlarged as at 226, as may be clearly seen in Fig. 15, and a groove 227 is formed centrally of the sleeve for forming two annular oil passage about the shaft. A plurality of openings 228 are formed through the walls of the sleeve to the passage 226 and similar openings 229 are formed through the walls to the groove 227.

The sleeve 225 is press fitted in a hub member 235, which hub is similar to hub 35 except that the inside surface has preferably four longitudinally extending grooves 236 and two annular grooves 237 and 238 which extend about the inside surface of the hub. An opening 239 leads outwardly to a valve 240, which valve is similar to the valve 49 in hub 35.

In this form of the invention, when the pump mechanism is operated, the oil flows from the pump, through check valve 97, bore 76, passages 77 to chambers 75, then into passages 226, through opening 228 and into passages 237, along groove 236 into groove 238 and out of opening 239 from groove 238 and through check valve 240. The flow of oil through the passages 236, 237 and 238 carries away heat generated in the bearing and oil in passages 226 and 227 feed oil between the sleeve and shaft. Otherwise the operation of the rollers 20 and 220 are similar.

By our invention we have provided a bearing mechanism that is self-lubricating and will prevent grit and other foreign material from entering between the bearing surfaces. Thus, the bearing is extremely useful for use in mechanisms wherein thorough lubrication is essential, but where facilities for supplying adequate lubrication are otherwise impossible or impractical.

Although we have shown but two forms of embodiments of our invention, it is to be understood that other forms of the invention might be adopted, all falling within the scope of the following claims.

We claim:

1. A bearing mechanism comprising in combination, an axle, a tubular bearing element mounted on said axle; confronting bearing surfaces on said axle and elements; an oil pump comprising two cooperating components, one of said components being operatively associated with said axle and the other of said components being operatively associated with said bearing element, whereby said pump is actuated by relative movement between said axle and bearing element; means forming an oil passage from the outlet of said pump to said bearing surfaces and from said bearing surfaces to the intake of said pump, said means including an oil seal located intermediate said axle and an end of said tubular bearing element, said seal being adapted to permit a relatively small leakage of oil therethrough for excluding grit and the like from entering said oil passage and valve means in the oil passage from said bearing surface to the intake of said pump for restricting the flow of oil therethrough to maintain an oil pressure within the bearing.

2. A bearing mechanism comprising in combination, an axle, a tubular bearing element mounted on said axle; confronting bearing surfaces on said axle and element; an oil pump comprising two cooperating components, one of said components being operatively associated with said axle and the other of said components being operatively associated with said bearing element whereby said pump is actuated by relative movement between said axle and bearing element; means forming an oil passage from the outlet of said pump to said bearing surfaces and from said bearing surfaces to the intake of said pump, and a pressure responsive valve in the portion of said oil passage leading from said bearing surfaces to the intake of said pump for preventing passage of oil to said pump until the oil pressure at the bearing surface has reached a predetermined amount.

3. In a bearing mechanism, two confronting bearing surfaces movable relative to one another; an oil pumping means; means forming an oil passage from said pump to said bearing surfaces and an oil passage leading from said bearing surfaces to the intake of said pump; and a pressure responsive valve in the second mentioned passage for preventing flow of oil to said pump until a predetermined oil pressure has been attained at said bearing surface.

4. A bearing mechanism comprising, an axle; a sleeve member mounted on said axle; bearing surfaces between said sleeve and axle; a tubular member surrounding said sleeve member relatively loosely, one of said members having a plurality of depressions formed therein and the other of said members having projections extending in said depressions, the walls of said depressions and projections forming oil pockets; means for forcing oil into said pockets, said tubular member having an outlet therein for removing oil from said pockets; and a pressure responsive valve in said outlet for preventing flow of oil therethrough at less than a predetermined pressure.

5. A bearing mechanism comprising in combination, an axle having a longitudinally extending bore; a tubular bearing element mounted on said axle; confronting bearing surfaces on said axle and element; an oil pump comprising two cooperating components, one of said components being operatively associated with said axle and the other of said components being operatively associated with said bearing element, whereby said pump is actuated by relative movement between said axle and bearing element; means forming an oil passage from the outlet of said pump to said bearing surfaces, said means including the bore of said axle; a tubular member extending into the bore of said axle; a check valve in said tubular member for retaining oil in said tubular member; and means forming a check valve intermediate the exterior wall of said tubular member and the wall of said bore for permitting flow of oil through said bore to said bearing surfaces in one direction only.

6. A bearing mechanism comprising in combination, an axle; a tubular bearing element rotatively mounted on said axle; baffle means between the axle and bearing element; a pump operated by relative movement of the bearing element and axle; an oil passage leading from the exhaust of the pump to an area within said element bounded by said baffle; means forming an oil passage leading from said area to the intake of the pump; and a valve in the last mentioned passage adapted to close the passage until a predetermined oil pressure is present in said area, whereby said oil pressure acts on said baffle means to prevent infiltering of foreign material through the baffle.

JOHN A. CARR.
    WILLIAM C. CARROLL.
    ROBERT D. PIKE.

REFERENCES CITED

The following references are of record in the file of this patent:

UNITED STATES PATENTS

| Number | Name | Date |
|---|---|---|
| 824,187 | Lowe | June 26, 1906 |
| 1,323,474 | Hodgkinson | Dec. 2, 1919 |
| 1,743,712 | Funk | Jan. 14, 1930 |
| 2,299,119 | Yeomans | Oct. 20, 1942 |
| 2,325,283 | Swearingen | July 27, 1943 |
| 2,362,644 | Lemmon et al. | Nov. 14, 1944 |
| 2,377,526 | Side | June 5, 1945 |